Figure 4:
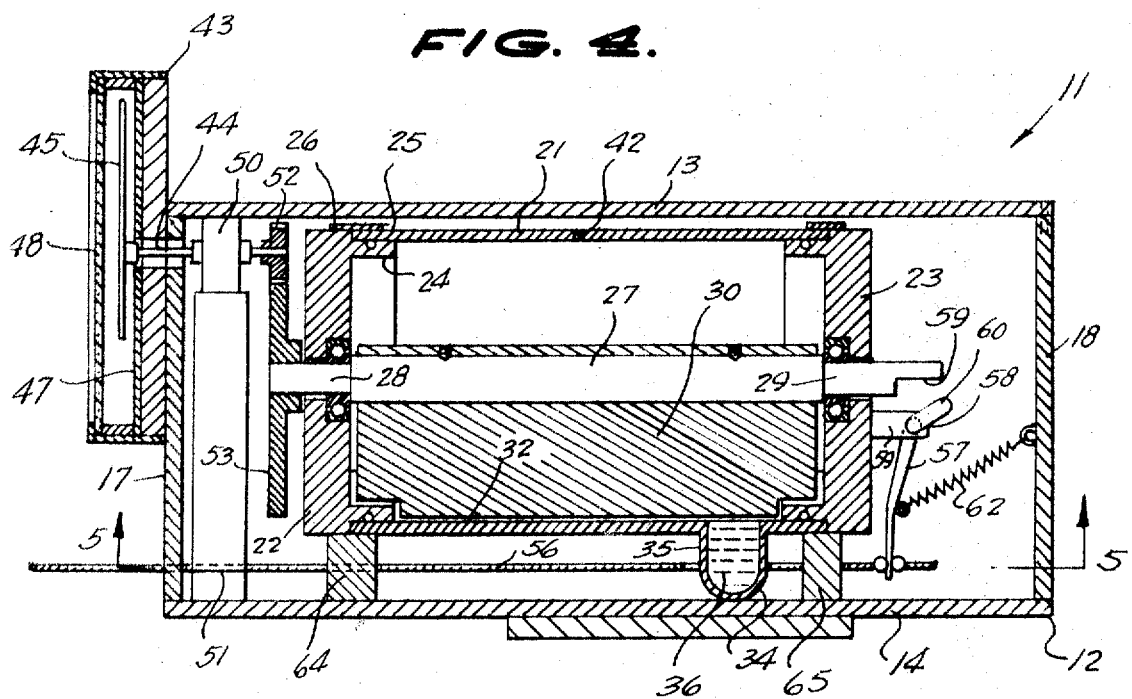

United States Patent

[11] 3,599,340

| [72] | Inventor | George S. Stockton<br>Artesia, N. Mex. |
|------|----------|---------------------------------------|
| [21] | Appl. No. | 861,293 |
| [22] | Filed | Sept. 26, 1969 |
| [45] | Patented | Aug. 17, 1971 |
| [73] | Assignee | Universal Equipment Co., Inc.<br>Artesia, N. Mex. |

[54] PENDULUM DAMPING DEVICE FOR DEGREE AND ANGLE INDICATOR
10 Claims, 5 Drawing Figs.

| [52] | U.S. Cl. | 33/220 R, 33/215 A |
| [51] | Int. Cl. | G01c 9/08 |
| [50] | Field of Search | 33/220 R |

[56] References Cited
UNITED STATES PATENTS

| 1,732,397 | 10/1929 | Braibant | 33/220 R |
| 2,716,556 | 8/1955 | Williams | 33/220 R |
| 2,924,022 | 2/1960 | Callahan | 33/220 R |

*Primary Examiner*—Leonard Forman
*Assistant Examiner*—Dennis A. Dearing
*Attorney*—Berman, Davidson and Berman ABSTRACT: A pendulum-type level indicator for use on earth-working vehicles. The indicator has a pendulum housing to which is connected a reservoir of damping liquid provided with a piston to force damping liquid into the housing. The degree of movement of the piston is controlled manually by the operator of the vehicle to provide the correct amount of pendulum damping in accordance with the type of terrain on which the vehicle is working or in accordance with the temperature conditions under which it is working. A cable-controlled manually operated mechanism is provided for locking the pendulum against rotation when use of the level indicator is not required, so as to prevent unnecessary wear on its moving parts.

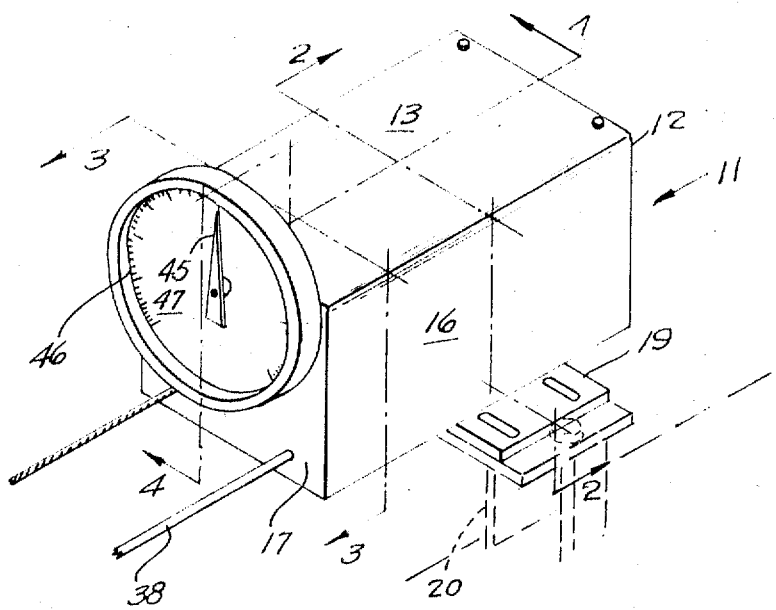
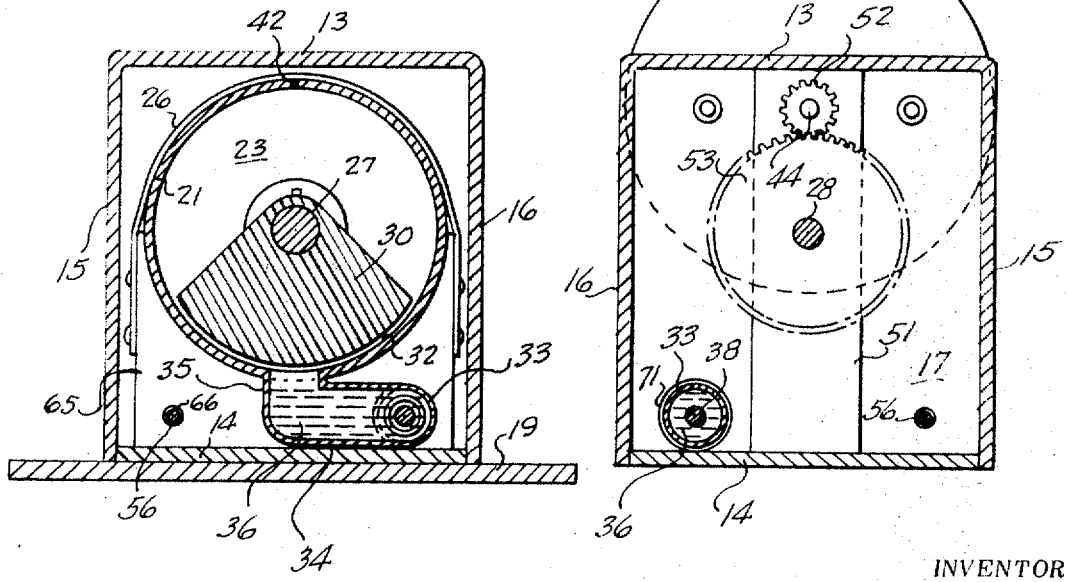

INVENTOR.
GEORGE S. STOCKTON,
BY
Berman, Davidson & Berman
ATTORNEYS

PENDULUM DAMPING DEVICE FOR DEGREE AND ANGLE INDICATOR

This invention relates to level indicators, and more particularly to level indicators especially adapted for use on earthworking vehicles, or other mobile devices encountering a wide variation in operating conditions.

A main object of the invention is to provide a novel and improved level-indicating device particularly suitable for use on earth-working machines and similar vehicles, the device being simple in construction, being reliable in operation, and being adjustable to provide accurate level indications over a wide range of different operating conditions.

A further object of the invention is to provide an improved pendulum-type level indicator especially suitable for use on earth-working machines or other mobile devices employed on terrain of varying characteristics or under varying temperature conditions the indicator being relatively compact in size, being durable in construction being inexpensive to manufacture, and being easily controlled by the operator of a vehicle on which it is mounted, in a manner such that the operator may readily adjust the damping characteristics of the indicator, or may render the indicator inoperative under conditions where its use is not required, without the necessity of leaving the operator's seat.

A still further object of the invention is to provide an improved adjustably damped pendulum-type level indicator for earth-working machines, or for similar mobile devices employed on terrain of widely varying characteristics, the indicator being provided with means to readily change its damping characteristics in accordance with the conditions under which the associated vehicle is working, and being further arranged so that its damping characteristics can be changed easily and conveniently by the operator of the associated vehicle while the vehicle is in operation and without the necessity of the operator stopping the vehicle to make the necessary changes.

Figure 5:
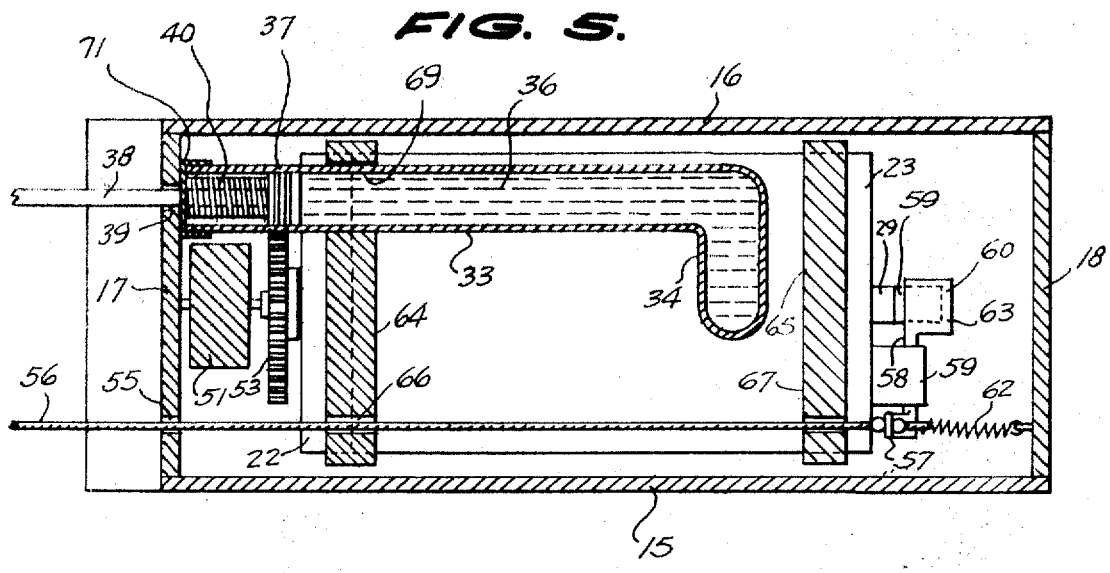

Further objects and advantages of the invention will become apparent from the following description and claims, and from the accompanying drawings, wherein:

FIG. 1 is a perspective view of an improved adjustably damped pendulum-type level indicator constructed in accordance with the present invention, FIG. 2 is an enlarged transverse vertical cross-sectional view taken substantially on the line 2-2 of FIG. 1, FIG. 3 is an enlarged transverse vertical cross-sectional view taken substantially on the line 3-3 of FIG. 1, FIG. 4 is an enlarged longitudinal vertical cross-sectional view taken substantially on the line 4-4 of FIG. 1, and FIG. 5 is a horizontal cross-sectional view taken substantially on the line 5-5 of FIG. 4.

The level indicator of the present invention is primarily intended to be used on earth-working machines, such as motor graders, or the like, or on other mobile vehicles intended for use under widely varying conditions, for example, for working on terrain of widely varying physical characteristics or under widely varying conditions of temperature, It is well known that motor graders and similar earth-working machines work in various types of material and under widely different temperature conditions. A pendulum-type level indicator mounted on such a machine would not operate satisfactorily under all of the expected operating conditions unless some means were provided for damping the pendulum of the level device to a degree corresponding to the particular operating condition at the time of its use. For example, while working in the mountains or over rocky terrain, the subgrade material is extremely rocky and rough. This requires a relatively large amount of pendulum damping, for example, increases the amount of liquid required in the damping chamber of the pendulum to steady the pendulum movement. This need arises due to the fact that a considerable amount of vibration occurs while working on such material. While working in dirt or sandy material, on the other hand, there is very little vibration transmitted to the pendulum, so that only a relatively small amount of damping is required, namely, so that only a relatively small amount of damping liquid is needed in the pendulum chamber. If the same amount of liquid employed for damping the pendulum for rocky road beds or other rocky terrain conditions remained in the chamber, the pendulum action would be too sluggish to provide satisfactory level indications when the machine was employed for working in dirt, sand or other relatively yieldable material. This would restrict the movement of the pendulum unnecessarily, and would give the operator a false level reading. Similarly, if the proper amount of liquid were employed for suitable pendulum damping for working in dirt, sand, or other relatively yieldable material, the pendulum movement would be too free to be reliable when the machine was employed to work in rocky material. The operator would then be unable to properly obtain accurate level readings because of the erratic movements of the pendulum. The same type of difficulty arises under wide changes in temperature, In cold weather the damping liquid tends to considerably increase its viscosity so that its damping action is much greater than under warm weather conditions. Thus, less damping liquid would be required to obtain a proper amount of damping of the pendulum under cold weather conditions than would be required to achieve the same degree of responsiveness of the level device under high temperature conditions.

It will thus be apparent that for proper utilization of a pendulum-type level indicator employing damping liquid, it is important to be able to suitably regulate the amount of damping of the pendulum produced by the damping liquid. The most efficient way of regulating the damping effect of the liquid on the pendulum is to regulate the amount of damping liquid employed, It is therefore a prime purpose of the present invention to provide a means whereby the amount of damping liquid acting on the pendulum can be accurately controlled by the operator of the associated earth-working vehicle or other machine employing the level device.

Referring to the drawings, 11 generally designates an improved level indicator constructed in accordance with the present invention. The level indicator 11 comprises a generally rectangular main housing 12 having a top wall 13, a bottom wall 14, sidewalls 15 and 16, a front end wall 17, and a rear end wall 18. Transversely secured to the bottom of the housing 12 at its intermediate portion is a mounting plate 19 which may be secured on a suitable frame portion 20 of the associated motor grader, or other earth-working machine with which the device is employed.

Longitudinally mounted within the main housing 12 is a cylindrical inner housing 21 having the substantially circular front and rear end walls 22 and 23. As shown in FIG. 4, the front and rear end walls 22 and 23 are provided with inwardly projecting annular sleeve portions 24 which are telescopically received in the end portions of the main cylindrical housing 21 and sealed relative thereto by suitable resilient deformable sealing rings 25, the end portions of the cylindrical housing member 21 being suitably clamped to the end wall members 22 and 23 for example, by clamping straps 26.

Designated at 27 is the pendulum shaft which is provided with reduced front and rear end portions 28 and 29 which are respectively centrally journaled in the front and rear end walls 22 and 23, and are rotatably sealed relative thereto. Shaft 27 extends axially through the cylindrical housing member 21 and has secured thereto the heavy pendulum member 30, which is sector-shaped in cross section, as is clearly shown in FIG. 2. The pendulum element 30 extends substantially for the entire length of the cavity defined between the end walls 22 and 23, and the periphery of the pendulum 30 is conformably shaped so as to extend closely adjacent to the inside surfaces of the inner housing, as is clearly shown in FIG. 4. Thus, a small clearance space 32 is defined between the pendulum 30 and the arcuate adjacent inside surfaces of cylindrical housing member 21 and the skirt portions 24 of end walls 22 and 23, substantially the same amount of clearance being provided between the opposite ends of the pendulum and the transverse inside surfaces of end walls 22 and 23.

Mounted beneath and laterally offset from the cylindrical housing member 21 is a longitudinally extending tubular reservoir 33 whose rear end portion is connected to the bottom of the inner cylindrical housing by a transversely extending conduit portion 34, which communicates with the bottom of cylindrical housing member 21 by a short vertical conduit portion 35, as shown in FIG. 2. The reservoir 33 contains suitable damping liquid 36, such as oil, or the like. Slidably and sealably mounted in the left end portion of the tubular reservoir 33 is a piston 37 having an axial piston rod 38 which projects outwardly through an aperture 39 provided in the end wall 17 and which extends parallel to the axis of main housing 12, as in clearly shown in FIG. 5. The rod 38 may be suitably connected by a conventional operating linkage to a control lever or knob located adjacent the operator's hands, so that the piston 37 may be moved inwardly or outwardly in the reservoir 33 by manual force exerted on the operating linkage connected to the rod 38. A biasing spring 40 is provided between piston 37 and wall 17, but the frictional engagement of the piston 37 with the inside surface of the reservoir 33 is sufficient to maintain the piston in any adjusted position in the reservoir until this position is manually changed by operating the actuating mechanism associated with the piston rod 38.

As will be readily apparent, the amount of damping liquid 36 acting on the pendulum member 30 may be regulated by correspondingly changing the position of the piston 37 in the tubular reservoir 33. Moving the piston inwardly increases the amount of damping liquid acting on the pendulum and thereby increases the damping action. Retracting the piston 37 allows the liquid to drain back into the reservoir 33 and lowers the level of the damping liquid in the pendulum chamber, thereby reducing the damping action. Thus, the amount of damping liquid in the pendulum chamber can be adjusted in accordance with the particular external working conditions, whereby to provide the adjustability in the damping of the pendulum desired in view of the widely different conditions under which the associated motor grader or other vehicle is required to work.

As will be readily apparent, the pendulum chamber may be suitably vented, as shown at 42, at allow for the necessary air displacement when damping liquid is forced into the pendulum chamber and to allow for air reentry when damping liquid is drained from the pendulum chamber, responsive to the corresponding adjustments in position of the piston 37.

Secured to the upper portion of front wall 17 of the main housing 12 is a circular dial casing 43 in which is centrally journaled the needle pointer shaft 44 carrying the indicating needle 45 which indicates angular position on an angle scale 46 inscribed at the margin of a circular dial plate 47. The casing 43 is provided with the circular transparent front window 48 through which needle 45 and dial 46 are clearly visible. The pointer shaft 44 is journaled in a bearing block 50 mounted at the top end of a supporting bracket 51 secured in the forward end portion of main housing 12. Secured on the inner end of the pointer shaft 44 is a pinion gear 52 which meshes with a large gear 53 secured on the forward shaft end portion 28. Thus, the rotation of shaft 27 produced by pendulum 30 responding to changes in lateral inclination of the vehicle is transmitted by gears 53 and 52 to the pointer shaft 44, causing the pointer 45 to correspondingly rotate relative the shaft axis and to correspondingly provide an angle indication on the scale 46. The swinging movement of the pendulum 30 is retarded in accordance with the height of damping liquid provided in the pendulum chamber, and therefore the sensitivity of the pendulum to vibration can be regulated by adjusting the height of the damping liquid in the pendulum chamber in the manner described above.

The piston control rod 38 extends through the aperture 39 in front wall 17, as above described Also extending through an aperture 55 in said front wall is a control cable 56 which is connected to the end of a locking lever 57 pivoted at 58 to a lug 59 projecting rearwardly from the end wall 23 of the pendulum chamber. A locking arm 60 projects from the lever shaft 58 and is biased toward engagement in a notch 59 provided in the end of the rear shaft portion 29, the locking arm 60 being biased toward locking position by a spring 62 which connects the intermediate portion of shaft 57 to end wall 18, as shown in FIG. 4. The longitudinally extending portion of notch 59 is flat, and the arm 60 is generally rectangular in shape, as shown in FIG. 5, so that the transverse outer edge 63 of arm 60 is lockingly engageable with the flat longitudinal surface of the notch 59 to lock the shaft 27 against rotation, under the biasing force of spring 62. However, when the lever 57 is rotated in a clockwise direction to the position of FIG. 4 by means of the release cable 56, arm 60 is completely clear of the notch 59 and the pendulum shaft 27 is free to respond to the gravitational force exerted thereon by the pendulum 30. The flexible cable 56 extends parallel to the rod 38 and may be suitably connected to an operating lever or actuating mechanism controlled at a position convenient to the operator of the vehicle, for example, by a control knob located on the instrument panel, with suitable latch means to retain the cable 56 in operating position, namely, to retain the locking arm 60 clear of the notch 59.

As shown in FIGS. 4 and 5, the pendulum housing is supported on a pair of transverse blocks 64 and 65 mounted on the housing bottom wall 14, and the cable 56 extends slidably through longitudinally aligned apertures 66 and 67 provided in said blocks. The tubular reservoir 33 likewise extends through a conformably shaped aperture 69 provided in the forward block 64.

As shown in FIG. 2, the reservoir clamping straps 26 are secured at their opposite ends to the front and rear supporting blocks 64 and 65.

The operating means associated with the piston rod 38 is preferably suitably calibrated in terms of the various degrees of damping correspondingly to the various degrees of longitudinal adjustments of the piston rod 38 relative to the reservoir 33.

IT will be noted that the reservoir 33 is provided at its left end, as seen in FIG. 5, with a closure cap 71, with one end of the spring 40 received in said closure cap, and the other end engaging against the piston 37, the closure cap being in abutment with the housing end wall 17.

Within the spirit of the present invention, the spring 40 may be made sufficiently strong to exert a biasing force on the piston 37 to urge it to the right, as viewed in FIG. 5, namely, to urge damping liquid into the pendulum casing, and the operating means associated with the piston rod 38 may be provided with suitable latching means to hold the piston rod 38 retracted against the biasing force of spring 40. As above mentioned, the operating means for the piston rod 38 may be suitably calibrated in terms of various degrees of damping, whereby the rod 38 may be retracted to reduce the amount of damping in accordance with the particular conditions under which the associated machine is working.

The device 11 may be mounted in any desired orientation on the associated machine, and ordinarily will be mounted with its pendulum axis extending longitudinally of the machine, whereby to indicate lateral tilt of the machine.

As above-described, pendulum shaft 27 may be locked in a fixed position when the use of the level device is not required, by releasing the cable 56 and allowing the locking arm 60 to engage beneath the flat longitudinal surface of notch 59. This prevents unnecessary wear on the gear train defined by the gears 53 and 52, as well as preventing unnecessary wear of other parts of the mechanism, such as on the various bearing units thereof.

While a specific embodiment of an improved pendulum-type level indicator for use on earth-working vehicles or on other machines operating in different or changing environments has been disclosed in the foregoing description, it will be understood that various modifications within the spirit of the invention may occur to those skilled in the art. Therefore,

What I claim is:

1. A level indicator comprising a casing, a pendulum journaled in said casing, an angle indicating member movably mounted relative to said casing, means drivingly coupling said pendulum to said angle indicating member, a reservoir below the casing containing damping liquid, conduit means communicatively connecting said reservoir to the bottom of said casing, and means to force a regulated amount of damping liquid upwardly from said reservoir into said casing into contact with said pendulum.

2. The level indicator of claim 1, and wherein said means to force damping liquid upwardly comprises a piston slidably and sealingly mounted in said reservoir, and means to move said piston axially in the reservoir.

3. The level indicator of claim 2, and wherein said reservoir comprises a tubular vessel extending parallel to the rotary axis of the pendulum and having an end wall.

4. The level indicator of claim 3, and wherein the means to move said pendulum comprises an operating rod secured to the piston and extending substantially longitudinally of the reservoir and extending through the end wall thereof.

5. The level indicator of claim 4, and wherein said pendulum is provided with a supporting shaft, and wherein the means drivingly coupling the pendulum to the angle indicating member comprises a gear train between said shaft and the indicating member.

6. The level indicator of claim 5, and means on the casing at times lockingly engageable with the shaft to prevent rotation thereof.

7. The level indicator of claim 6, and wherein said shaft has a flattened end portion, and said locking means comprises a locking arm pivoted to the casing, and means to rotate said locking arm into abutment with said flattened end portion.

8. The level indicator of claim 7, and wherein said means to rotate said locking arm comprises a spring connected to the arm and biasing said arm toward locking position, and a flexible cable connected to said arm to rotate said arm to unlocking position.

9. The level indicator of claim 4, and wherein said casing is substantially circular in cross section and said pendulum has an arcuate periphery concentric with the casing and defining a relatively narrow clearance therewith adapted to receive damping liquid.

10. The level indicator of claim 9, and wherein the pendulum is substantially sector-shaped in cross section, and is substantially coextensive in length with the casing.